(12) United States Patent
Hsien-Chin

(10) Patent No.: US 6,674,638 B2
(45) Date of Patent: Jan. 6, 2004

(54) FASTENING DEVICE

(75) Inventor: Chiang Hsien-Chin, Taipei Hsien (TW)

(73) Assignee: Acer Inc. (TW)

( * ) Notice: Subject to any disclaimer, the term of this patent is extended or adjusted under 35 U.S.C. 154(b) by 151 days.

(21) Appl. No.: 09/988,726

(22) Filed: Nov. 20, 2001

(65) Prior Publication Data

US 2003/0002245 A1 Jan. 2, 2003

(30) Foreign Application Priority Data

Jun. 27, 2001 (CN) .......................... 90115665 A

(51) Int. Cl.$^7$ .............................. G06F 1/16; H05K 7/16
(52) U.S. Cl. ................... 361/683; 361/681; 174/50; 292/110; 292/129; 312/223.1; D14/336
(58) Field of Search ................ 361/681–683; 312/223.1, 223.2; 292/95, 112, 129, 121; D14/336, 439, 448–450; 174/66, 50; 220/241, 3.2, 3.92, 3.94, 4.02

(56) References Cited

U.S. PATENT DOCUMENTS

| | | | | |
|---|---|---|---|---|
| 1,007,398 A | * | 10/1911 | Snider | 292/129 |
| 1,160,105 A | * | 11/1915 | Bodenstein | 292/95 |
| 4,832,419 A | * | 5/1989 | Mitchell et al. | 361/681 |
| 4,846,536 A | * | 7/1989 | Saitou et al. | 361/682 |
| 5,335,142 A | * | 8/1994 | Anderson | 361/681 |
| 5,587,876 A | * | 12/1996 | O'Brien et al. | 361/682 |
| 5,973,916 A | * | 10/1999 | Han | 361/682 |
| 6,366,454 B1 | * | 4/2002 | Rapaich et al. | 361/683 |
| 6,535,380 B1 | * | 3/2003 | Lee et al. | 361/683 |

* cited by examiner

Primary Examiner—Lisa Lea-Edmonds
(74) Attorney, Agent, or Firm—Michael D. Bednarek; Shaw Pittman LLP

(57) ABSTRACT

A fastening device is provided to assemble a first unit and a second unit. The first unit has a first cover and the second unit has a second cover. The fastening device comprises a positioning post mounted on the first cover; a positioning aperture positioned on the second cover; a sliding piece mounted on the second cover and having at least one arm of which a slant edge slants upward along a first direction; a resilient element of which one end is fixed on the sliding piece and the other end is fixed on the second cover for making the sliding piece move with the resilient element on the second cover; and an operating key being mounted on the upper end of the sliding piece such that a user can push the sliding piece along the first direction by means of the operating key.

9 Claims, 7 Drawing Sheets

FASTENING DEVICE

REFERENCE TO RELATED APPLICATION

The present application claims priority to Taiwan application No.090115665, entitled "Fastening Device," filed on Jun. 27, 2001.

BACKGROUND OF THE INVENTION

1. Field of the Invention

The present invention relates to a fastening device, and more particularly, to a fastening device which is easy to assemble and disassemble.

2. Description of the Prior Art

Computer has become an important tool rather than a simple calculator or word processor. Daily activities including looking for information, writing a report, chatting, reading news, briefing, sending an e-mail, etc., all can be done through a computer. Since computers are so close to our life, consumers have higher and higher expectation to the computers.

Taking a desktop computer for example, general desktop computers comprise the separate type computers and the all-in-one type computers. The so-called separate type computer refers to a computer system wherein a display unit and a computer unit are separated from each other, and the all-in-one type computer refers to a computer system wherein the display and the computer unit are integrated as a whole. These two types of computer systems have their own advantages and disadvantages. The advantages of the separate type computer are easy to be maintained and low cost of upgrade, but the disadvantage resides in its bulky volume. The advantages of the all-in-one type computer reside in its small volume, and its whole appearance can be better designed to produce a unique valuable sense to inspire the consumers with interest in using. However, since the computer unit and display unit of the all-in-one type computer cannot be separated from each other, it is difficult to be maintained. Further, since most of the all-in-one type computers use expensive liquid crystal display units and when upgrading, the all-in-one type computer needs to replace the whole computer system, it is impossible to separate the liquid crystal display unit from the whole computer unit and thus leads to high cost of upgrade.

SUMMARY OF THE INVENTION

It is therefore an object of the present invention to provide a fastening device for hanging and fixing the computer unit onto the display unit. Said fastening device is easy for the user to assemble and disassemble the computer unit and display unit.

According to an object of the invention, a fastening device is provided to assemble a first unit and a second unit wherein the first unit has a first cover and the second unit has a second cover. The first unit can be a computer unit and the second unit can be a display unit. Said fastening device comprises a positioning post having a post body and a round top, one end of the post body being mounted on the first cover, and the diameter of the round top being larger than that of the post body; a positioning aperture being positioned on the second cover and having a round hole and an elongate extension hole, the round hole permitting the round top to pass therethrough, and the width of the elongate extension hole being smaller than the diameter of the round top and the elongate extension hole permitting the post body to move therein; a sliding piece being mounted on the second cover and having at least one arm of which a slant edge slants upward along a first direction; a resilient element of which one end is fixed on the sliding piece and the other end is fixed on the second cover for connecting the sliding piece with the second cover and making the sliding piece move with the resilient element on the second cover; and an operating key being mounted on the upper end of the sliding piece such that a user can pushes the sliding piece along the first direction by means of the operating key. Before the positioning post is inserted into the positioning aperture, the arm of the sliding piece is just above the elongate extension hole. When the positioning post is inserted into the positioning aperture, the positioning post will be pulled downward due to the gravity of the first unit such that the positioning post slides downward along the slant edge of the arm whereby the positioning post will push the sliding piece along the first direction and thus the spring is stretched. When the positioning post continues to slide downward to the bottom of the elongate extension hole, the sliding piece will be pulled back due to the resilient force of the resilient element such that the arm returns to the position above the elongate extension hole to fix the positioning post.

It is an advantage of the present invention that the fastening device can help the user to hang and fix the computer unit onto the display unit, and it is easy for the user to assemble or disassemble the computer unit and the display unit such that the whole computer system having the fastening device in accordance with the invention possesses the advantages of both the separate type and all-in-one type of computers.

These and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The aforesaid object, features and advantages of the present invention can be best understood from the following detailed description of the preferred embodiment and the accompanying drawings, wherein.

DETAILED DESCRIPTION OF THE PREFERRED EMBODIMENT

Figure 1B:
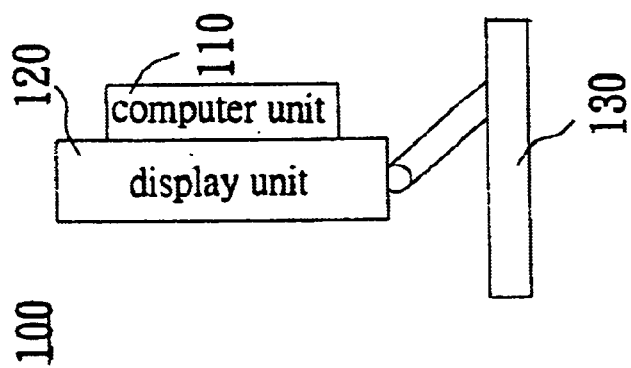
FIG. 1B is a side view showing the computer unit and display unit of FIG. 1A after being assembled together.
Figure 1A:
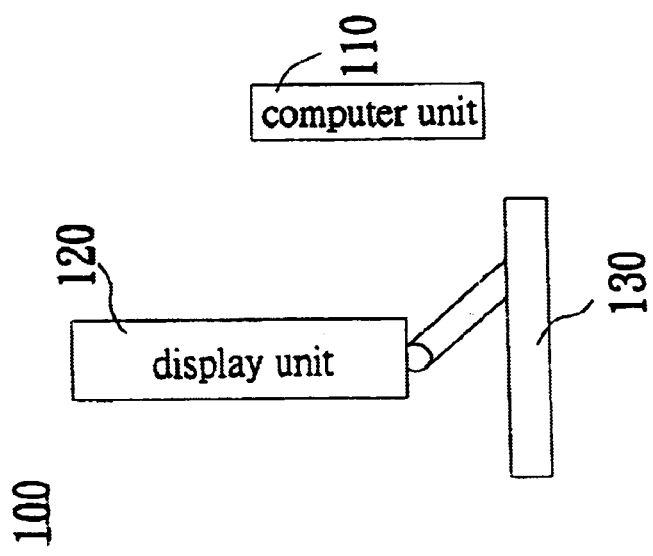
FIG. 1A is a side view showing a preferred embodiment in accordance with the present invention.

Please refer to FIG. 1A which is a side view showing a preferred embodiment in accordance with the present invention. As shown in FIG. 1A a computer system 100 comprises a computer unit 110, a display unit 120 and a base 130, and the display unit 120 is fixed on the base 130. The display unit 120 may be a liquid crystal display unit. The computer unit 110 comprises the central processing unit, the hard disk, the memory, the display card, the sound card, the modem, and other hardware or software needed by the computer system 100. The computer unit 120 and display unit 120 are both separate units, and thus the computer system 100 has the advantages of a separate type of computer, i.e., easy to maintain and upgrade. However, one of the differences between the computer system 100 and general separate type of computers resides in that the computer system 100 comprises a fastening device (not shown in the drawing), and a user can easily assemble the computer unit 110 and the display unit 120 together by means of the fastening device. Please refer to FIG. 1B which is a side view showing the computer unit 110 and display unit 120 of FIG. 1A after being assembled. As shown in FIG. 1B, the computer unit 110 and the display unit 120 after assembled together by means of the fastening device (not shown in the drawing) can be viewed as a whole unit which decreases the space occupied by the computer system 100 (as shown in FIG. 1A) such that the computer system 100 also has the advantages of the all-in-one computer. The structure of the fastening device will be described in the following paragraphs.

Figure 2A:
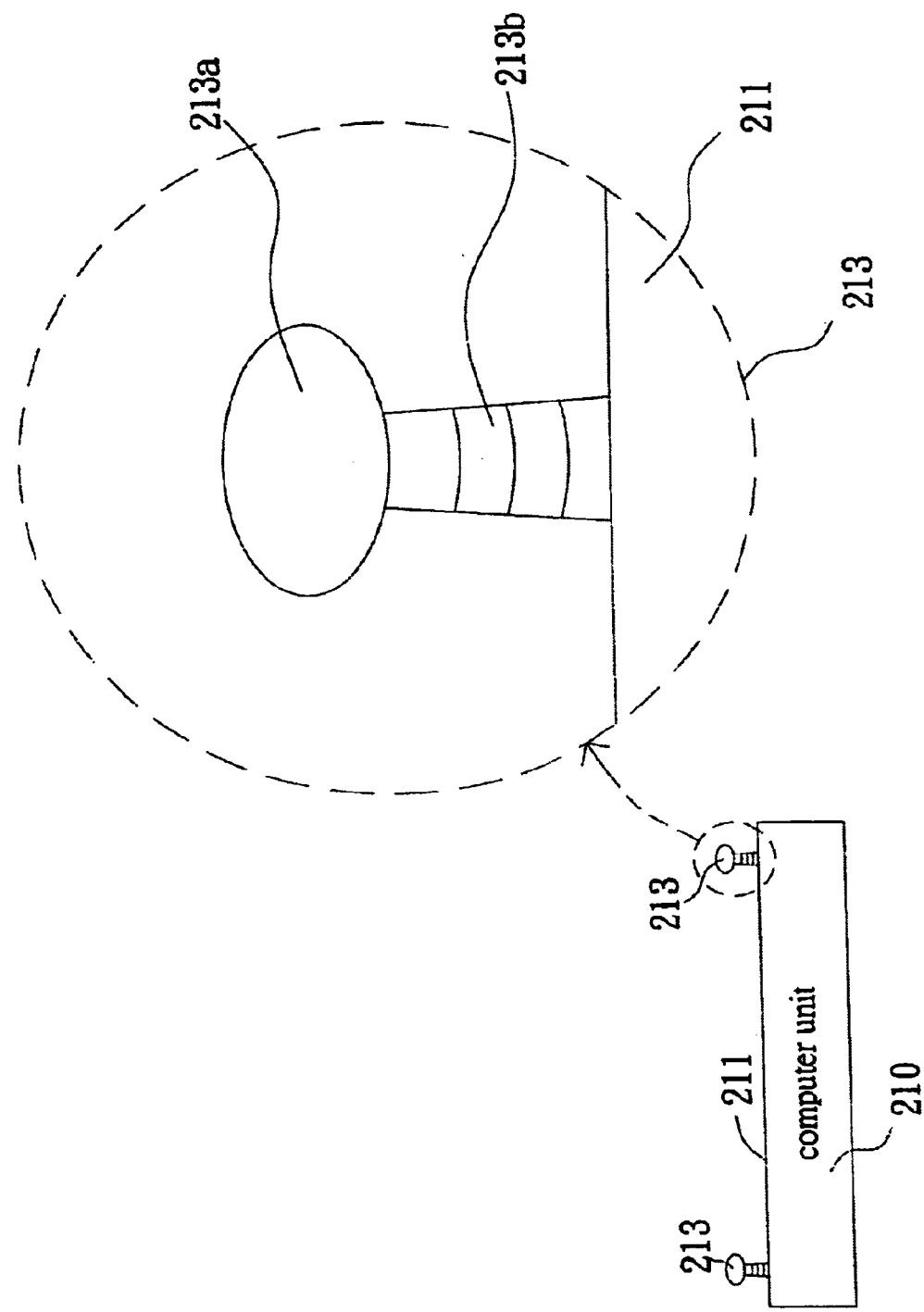
FIG. 2A is a side view showing a cover of the computer unit of the preferred embodiment in accordance with the present invention.

Please refer to FIG. 2A which is a side view showing a cover of the computer unit 210 of the preferred embodiment in accordance with the present invention. As shown in FIG. 2A, the computer unit 210 has a first cover 211 having two projecting positioning posts 213 for fixing the computer unit 210 onto the display unit (not shown in the drawing). The positioning post 213 comprises a round top 213a and a post body 213b, and the diameter of the round top 213a is larger than that of the post body 213b. The positioning post 213 can be a pin.

Figure 2B:
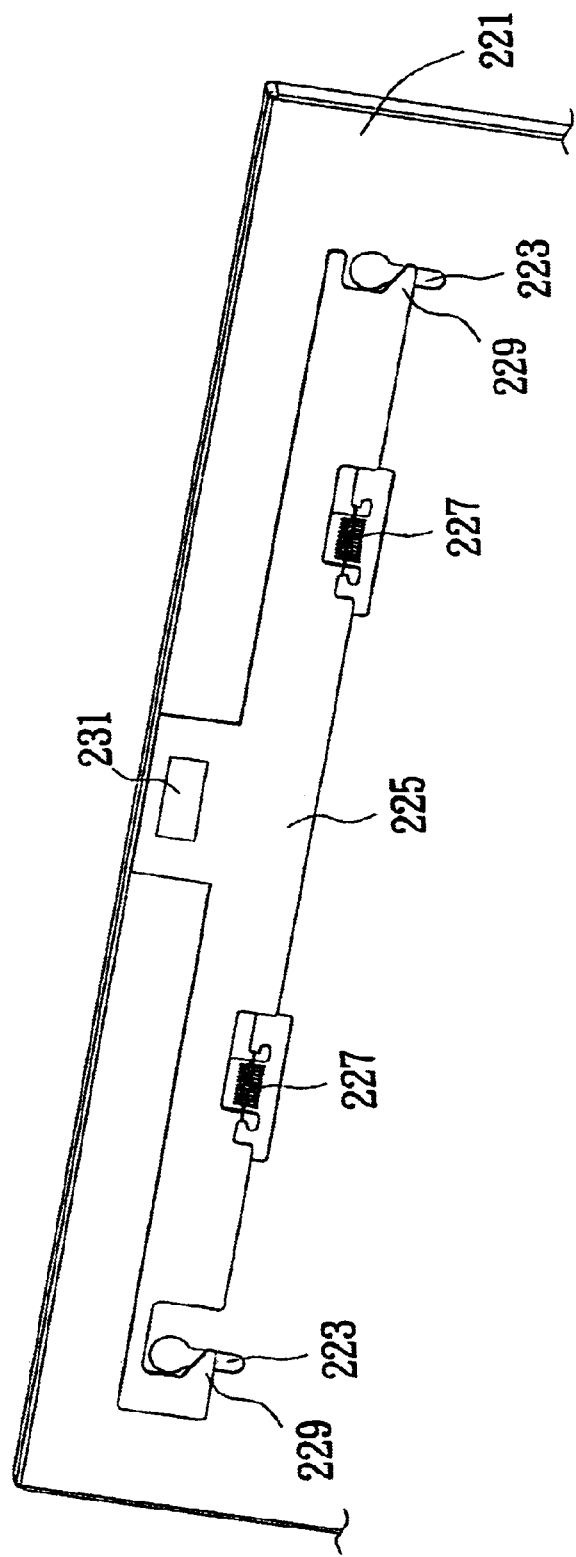
FIG. 2B is a schematic view showing the rear side of a cover of the display unit of the preferred embodiment in accordance with the present invention.

Please refer to FIG. 2B which is a schematic view showing the rear side of a cover of the display unit of the preferred embodiment in accordance with the present invention. As shown in FIG. 2B, the display unit (not shown in the drawing) has a second cover 221 which has two positioning apertures 223, a sliding piece 225, two springs 227 and an operating key 231. One end of the spring 227 is connected with the sliding piece 225, and another end of the spring 227 is connected to the second cover 221. Therefore, the sliding piece 225 can move with the springs 227 on the second cover 221. The spring 227 can be replaced by other resilient elements having resilient force. Each of the two ends of the sliding piece 225 has an arm 229 of which a slant edge slants upward along a first direction, which refers to a leftward direction. The arm 229 of the sliding piece 225 is just located above the positioning aperture 223. The operating key 231 is mounted on the sliding piece 225 such that when a user pushes the operating key 231 along the first direction, the operating key 231 will bring the sliding piece 225 to move along the first direction.

The first cover of FIG. 2A and the second cover of FIG. 2B form the fastening device of the present invention such that the user only needs to insert the positioning posts 213 of the first cover 211 into the positioning apertures 223 to complete the procedure of hanging the computer unit 210 onto the second cover 221 of the display unit (not shown in the drawing). The positioning post 213 inserted into the positioning aperture 223 will be pulled downward by the gravity due to the weight of the computer unit 210 whereby the arm 229 will be pushed leftward, and when the positioning post 213 is lowered to the bottom of the positioning aperture 223, the arm 229 will return to the original position due to the resilient force of the spring 227, and the positioning post 213 will be fixed at the bottom of the positioning aperture 223. When the user wants to separate the computer unit 210 from the second cover 221, he only needs to pushes the operating key to the left, and then lifts the computer unit 210 upward to disengage the positioning posts 213 from the positioning apertures 223.

Figure 3A:
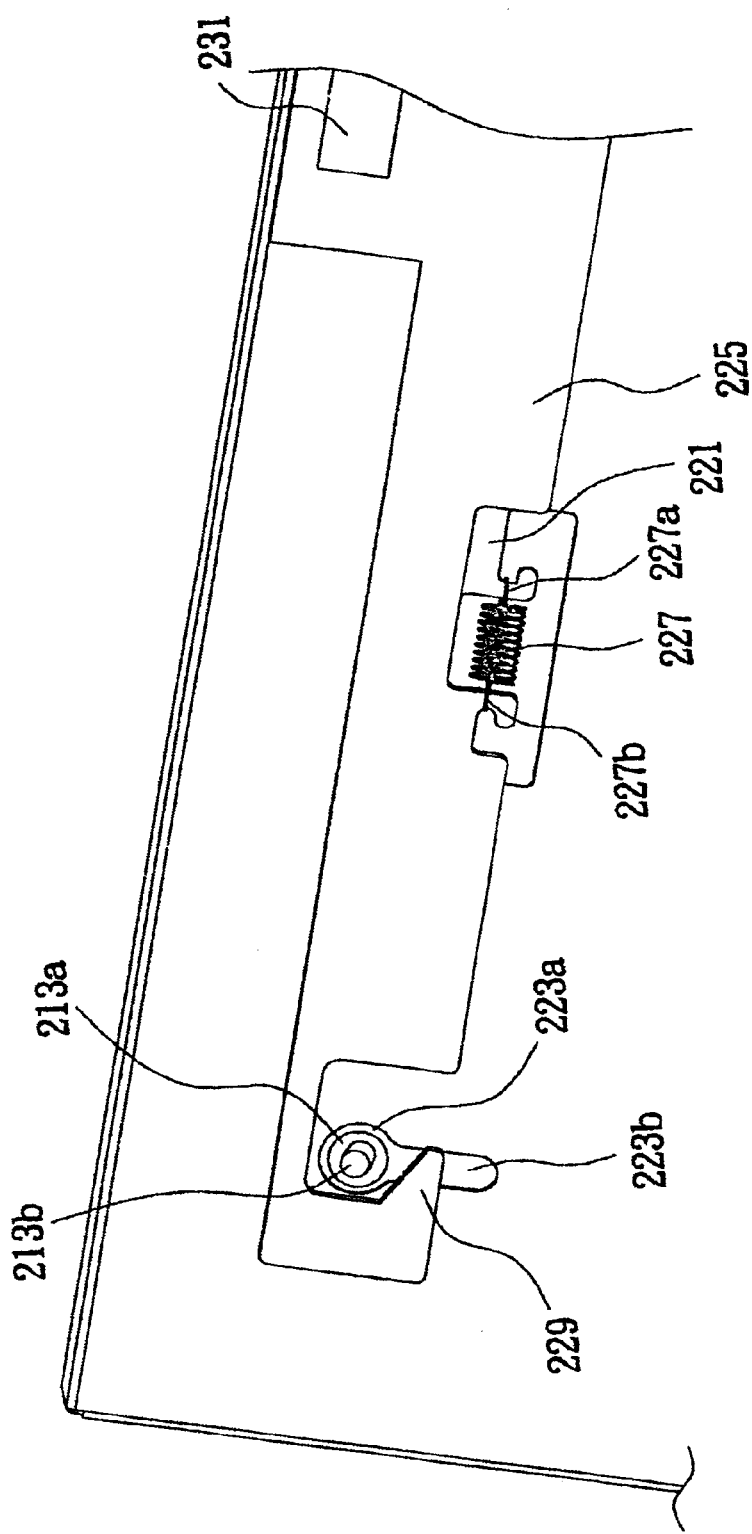
FIG. 3A to FIG. 3C are schematic views showing the fastening procedure.
Figure 3B:
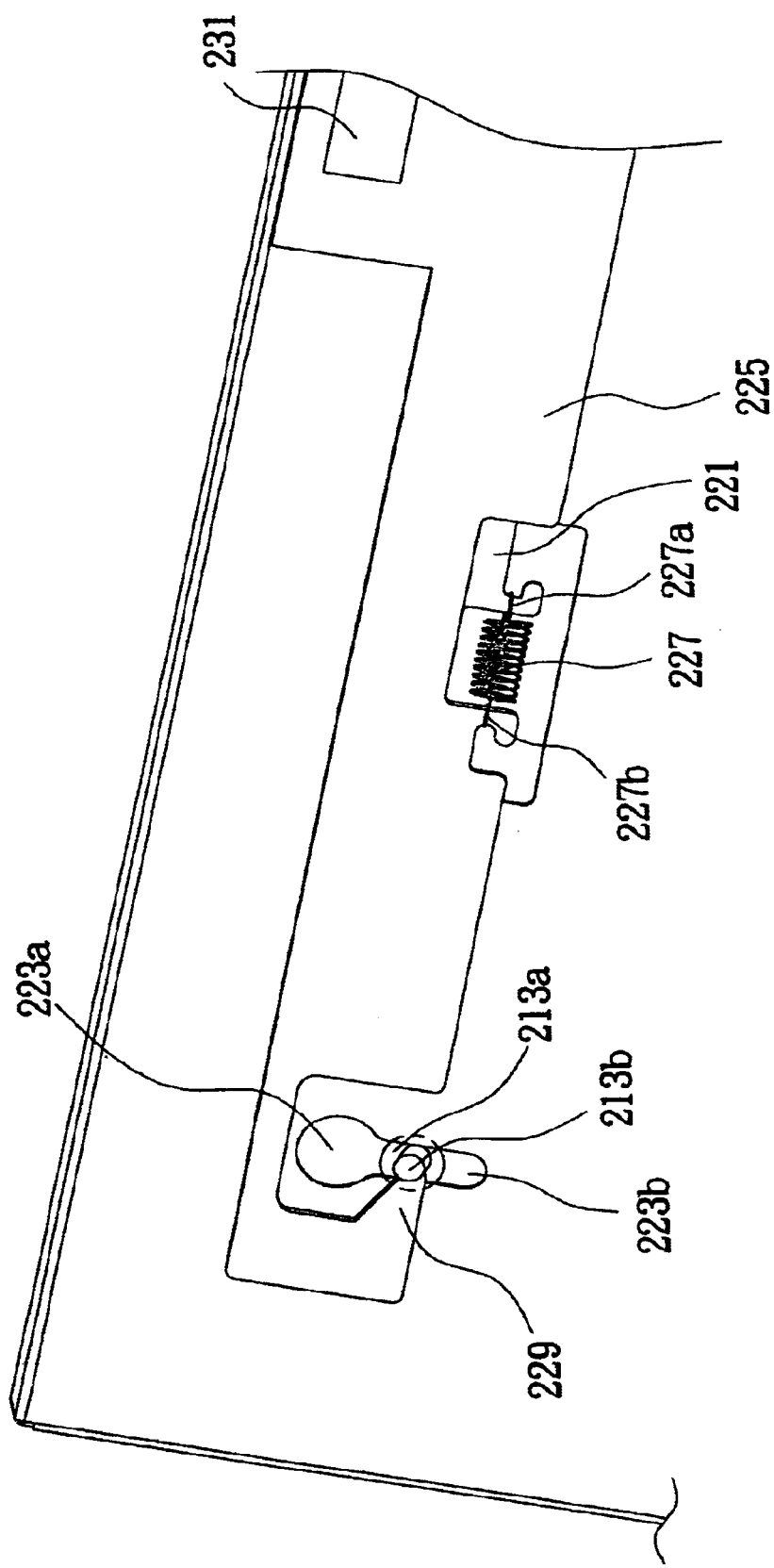
Figure 3C:
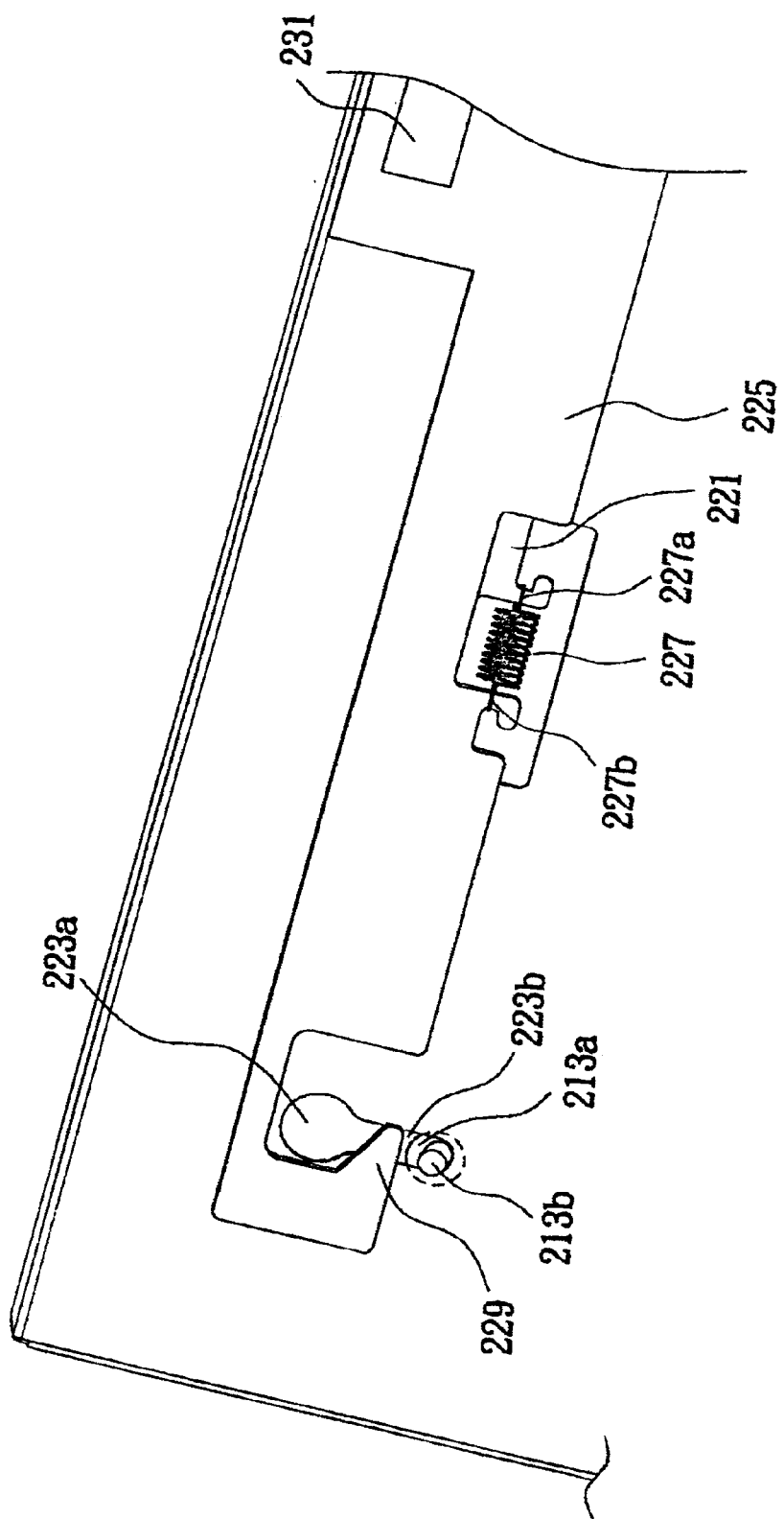

Please refer to FIGS. 3A to 3C which are schematic views showing the fastening procedure. For clearly showing the procedure of the fastening, only the left positioning post and left portion of the second cover are shown in FIGS. 3A to 3C. FIG. 3A is a schematic view showing the beginning of the fastening procedure wherein the positioning post has just begun to be inserted into the positioning aperture. As shown in FIG. 3A, the positioning aperture 223 has a round hole 223a and an elongate extension hole 223b. The round hole 223a permits the round top 213a and the post body 213b to pass therethrough, but the width of the elongate extension hole 223b is smaller than the diameter of the round top 213a and the elongate extension hole 223b permits the post body 213b to move therein. One end of the post body 213b of the positioning post is connected to the round top 213a and another end is mounted on the first cover of the computer unit (not shown in the drawing) The end of the sliding piece 225 has an arm 229 of which a slant edge slants upward and leftward. When the positioning post 213 has just begun to be inserted into the round hole 223a of the poisoning aperture 223, the arm 229 of the sliding piece 225 is exactly above the elongate extension hole 223b. One end of the spring 227 hooks the second cover 221 while another end 227b hooks the sliding piece 225.

Please now refer to FIG. 3B. After the positioning post 213 is inserted into the round hole 223a, the positioning post 213 will be pulled downward due to the weight of the computer unit (not shown in the drawing), and thus the post body 213b of the positioning post 213 will slide downward along the slant edge of the arm 229. After the post body 213b slides to the bottom of the arm 229, the post body 213b will push the arm 229 and the sliding piece 225 leftward due to the gravity pulling the positioning post 213 downward, and thus the spring 227 is stretched. When the post body 213b continues to slide to the bottom of the elongate extension hole 223b due to the gravity, the spring 227 and the sliding piece 225 connected to the spring 22 will return to the original position due to the resilient force of the stretched spring 227. As shown in FIG. 3C, the spring 227 has returned to the original position, and the arm 229 of the sliding piece 225 also returns to the position above the elongate extension hole 223b whereby the positioning post 213 will be fixed at the bottom of the elongate extension hole 223b.

Since the operating key 231 on the sliding piece 225 can bring the sliding piece 225 to move aside, when the user wants to separate the computer unit from the display unit, he only needs to push the operating key 231 leftward to bring the sliding piece 225 to move leftward and then lifts the computer unit upward and moves the positioning posts 213 upward and toward the round holes 223a such that the positioning posts 213 can be pulled out from the round holes 223a to complete the separation of the computer unit from the display unit.

Figure 4:
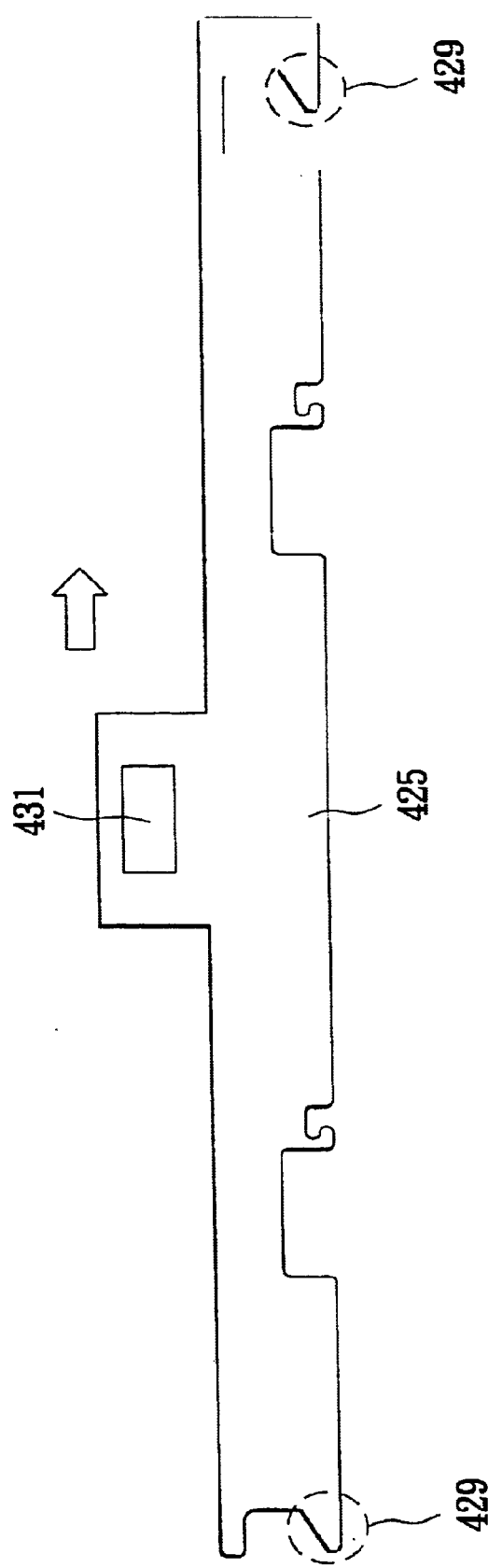
FIG. 4 is a schematic view showing a slant edge of an arm of a sliding piece slants rightward and upward.

Although the slant edge of the arm 229 of the sliding piece 225 shown in FIG. 2B slants leftward and upward, the present invention is not limited to such a case. Please refer to FIG. 4 which is a schematic view showing a slant edge of an arm of a sliding piece slants rightward and upward. As shown in FIG. 4, the slant edge of the arm 429 of the sliding piece 425 slants rightward and upward, and the operating key 431 mounted on the sliding piece 425 can allow the user to pull the sliding piece 425 rightward. Using such a fastening device with the sliding piece 425, when the positioning posts slide downward due to the gravity, the sliding piece will be pushed rightward, and when the positioning posts slide toward the bottom of the positioning apertures, the sliding piece will return to the original position due to the resilient force of the springs. The present invention is not limited to assemble a computer unit and a display unit, but also can be adapted to hang a first unit onto a second unit if the weight of the first unit is heavy enough so that the positioning posts can push the sliding piece to move.

The fastening device of the invention disclosed in the aforesaid embodiments can help the user to hang and fix the computer unit onto the display unit, and it is easy for the user to assemble or disassemble the computer unit and the display unit such that the whole computer system having the fastening device in accordance with the invention possesses the advantages of both the separate type and all-in-one type of computers.

The present invention is not limited by the forgoing description of the embodiments. The invention may be embodied in other specific forms without departing from the spirit or essential characteristic of the appended claims.

What is claimed is:

1. A fastening device for assembling a first unit and a second unit wherein said first unit has a first cover and said second unit has a second cover, said fastening device comprising:

a positioning post having a post body and a round top, one end of said post body being mounted on the first cover, and the diameter of said round top being larger than that of said post body;

a positioning aperture being positioned on said second cover and having a round hole and an elongate extension hole, said round hole permitting said round top to pass therethrough, and the width of said elongate extension hole being smaller than the diameter of said round top and said elongate extension hole permitting said post body to move therein;

a sliding piece being mounted on said second cover and having at least one arm of which a slant edge slants upward along a first direction;

a resilient element of which one end is fixed on said sliding piece and the other end is fixed on said second cover for connecting said sliding piece with said second cover and allowing said sliding piece to move with said resilient element on said second cover; and an operating key being mounted on the upper end of said sliding piece such that a user can pushes said sliding piece along the first direction by means of the operating key;

whereby before said positioning post is inserted into said positioning aperture, said arm of said sliding piece is just above said elongate extension hole; when said positioning post is inserted into said positioning aperture, said positioning post will slide downward along said slant edge of said arm due to the gravity of said first unit such that said positioning post pushes said sliding piece along the first direction and thus said spring is stretched; when said positioning post continues to slide downward to the bottom of said elongate extension hole, said sliding piece will be pulled back due to the resilient force of said resilient element such that said arm returns to the position above said elongate extension hole to fix said positioning post.

2. A fastening device as claimed in claim 1, wherein said first unit is a computer unit, and said second unit is a display unit.

3. A fastening device as claimed in claim 2, wherein said display unit is a liquid crystal display unit.

4. A fastening device as claimed in claim 1, wherein said positioning post is a pin.

5. A fastening device as claimed in claim 1, wherein said resilient element is a spring.

6. A fastening device for assembling a computer unit and a display unit wherein said computer unit has a first cover and said display unit has a second cover, said fastening device comprising:

a positioning post having a post body and a round top, one end of said post body being mounted on the first cover, and the diameter of said round top being larger than that of said post body;

a positioning aperture being positioned on said second cover and having a round hole and an elongate extension hole, said round hole permitting said round top to pass therethrough, and the width of said elongate extension hole being smaller than the diameter of said round top and said elongate extension hole permitting said post body to move therein;

a sliding piece being mounted on said second cover and having at least one arm of which a slant edge slants upward along a first direction;

a resilient element of which one end is fixed on said sliding piece and the other end is fixed on said second cover for connecting said sliding piece with said second cover and allowing said sliding piece to move with said resilient element on said second cover; and an operating key being mounted on the upper end of said sliding piece such that a user can pushes said sliding piece along the first direction by means of the operating key;

whereby before said positioning post is inserted into said positioning aperture, said arm of said sliding piece is just above said elongate extension hole; when said positioning post is inserted into said positioning aperture, said positioning post will slide downward along said slant edge of said arm due to the gravity of said computer unit such that said positioning post pushes said sliding piece along the first direction and thus said spring is stretched; when said positioning post continues to slide downward to the bottom of said elongate extension hole, said sliding piece will be pulled back due to the resilient force of said resilient element such that said arm returns to the position above said elongate extension hole to fix said positioning post.

7. A fastening device as claimed in claim 6, wherein said display unit is a liquid crystal display unit.

8. A fastening device as claimed in claim 6, wherein said positioning post is a pin.

9. A fastening device as claimed in claim 6, wherein said resilient element is a spring.

* * * * *